United States Patent
Inamdar

(10) Patent No.: US 9,705,693 B1
(45) Date of Patent: Jul. 11, 2017

(54) PROVISIONING USING MULTICAST TRAFFIC

(71) Applicant: MARVELL INTERNATIONAL LTD., Hamilton (BM)

(72) Inventor: Amey Dattatray Inamdar, Pune (IN)

(73) Assignee: Marvell International Ltd., Hamilton (BM)

( * ) Notice: Subject to any disclaimer, the term of this patent is extended or adjusted under 35 U.S.C. 154(b) by 88 days.

(21) Appl. No.: 14/566,507

(22) Filed: Dec. 10, 2014

Related U.S. Application Data

(60) Provisional application No. 61/914,147, filed on Dec. 10, 2013.

(51) Int. Cl.
| | |
|---|---|
| H04L 12/18 | (2006.01) |
| H04W 4/00 | (2009.01) |
| H04W 4/06 | (2009.01) |
| H04W 12/06 | (2009.01) |
| H04L 29/06 | (2006.01) |
| H04W 84/12 | (2009.01) |

(52) U.S. Cl.
CPC .......... *H04L 12/1886* (2013.01); *H04L 63/10* (2013.01); *H04W 4/001* (2013.01); *H04W 4/06* (2013.01); *H04W 12/06* (2013.01); *H04W 84/12* (2013.01)

(58) Field of Classification Search
CPC .. H04W 48/18; H04W 72/121; H04L 5/0048; H04L 5/0053; H04L 12/18; H04L 49/201; H04L 5/005
See application file for complete search history.

(56) References Cited

U.S. PATENT DOCUMENTS

| | | |
|---|---|---|
| 9,220,012 B1 | 12/2015 | Inamdar |
| 2004/0034771 A1 | 2/2004 | Edgett et al. |
| 2005/0021781 A1 | 1/2005 | Sunder et al. |
| 2007/0254614 A1 | 11/2007 | Muralidharan et al. |
| 2008/0069105 A1 | 3/2008 | Costa et al. |
| 2008/0123577 A1* | 5/2008 | Jaakkola ........... H04W 52/0225 370/311 |

(Continued)

OTHER PUBLICATIONS

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, *The Institute of Electrical and Electronics Engineers, Inc.*, pp. 1-2695 (Mar. 29, 2012).

(Continued)

*Primary Examiner* — Jung Park

(57) ABSTRACT

A first communication device detects a plurality of multicast packets transmitted by a second communication device. The first communication device determines information contained in media access control (MAC) address fields of the plurality of multicast packets. The first communication device determines wireless local area network (WLAN) provisioning information for gaining access to the WLAN, wherein the provisioning information is determined from the information contained in the MAC address fields of the plurality of multicast packets.

20 Claims, 7 Drawing Sheets

(56) References Cited

U.S. PATENT DOCUMENTS

| | | | |
|---|---|---|---|
| 2009/0252165 A1* | 10/2009 | Zhang | H04L 12/1854 370/390 |
| 2011/0149731 A1* | 6/2011 | Gong | H04W 4/08 370/235 |
| 2011/0211219 A1 | 9/2011 | Bradley et al. | |
| 2012/0008529 A1 | 1/2012 | Averbuch et al. | |
| 2013/0229969 A1* | 9/2013 | Quan | H04L 12/189 370/312 |
| 2015/0373510 A1* | 12/2015 | Stojanovski | H04W 36/14 370/312 |

OTHER PUBLICATIONS

Specification of the Bluetooth System, Version 2.0: vol. 0, "Master Table of Contents & Compliance Requirements," pp. 1-74; vol. 1, "Architecture & Terminology Overview," pp. 1-92; vol. 2, "Core System Package [Controller Volume]", pp. 1-814; vol. 4, "Core System Package [Host Volume]," pp. 1-250, Nov. 4, 2004.

"Wi-Fi Peer-to-Peer (P2P) Technical Specification, Version 1.00", Wi-Fi Alliance, pp. 1-135, Dec. 1, 2009.

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, pp. 1-1184 (Jun. 12, 2007).

Chen, "Home Network Basis: Transmission Environments and Wired/Wireless Protocols," *Prentice Hall*, pp. 1-26 (Jul. 2003).

Hiertz, et al., "The IEEE 802.11 Universe," *IEEE Communications Magazine*, pp. 62-70, (Jan. 2010).

IEEE Std 802.11ac/D7.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).

Perahia, et al., "Gigabit Wireless LANs: an overview of IEEE 802.11ac and 80211ad," ACM SIGMOBILE Mobile Computing and Communications Review, vo. 15, No. 3, pp. 23-33 (Jul. 2011).

\* cited by examiner

PROVISIONING USING MULTICAST TRAFFIC

CROSS-REFERENCES TO RELATED APPLICATIONS

This application claims the benefit of the U.S. Provisional Patent Application No. 61/914,147, entitled "Provisioning Using Multicast Traffic," filed on Dec. 10, 2013, which is hereby incorporated by reference herein in its entirety.

FIELD OF THE DISCLOSURE

The present disclosure relates generally to communication networks and, more particularly, to techniques for exchanging wireless local area network (WLAN) provisioning information.

BACKGROUND

Wireless local area network (WLAN) technology has evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps); the IEEE 802.11a and 802.11g Standards specify a single-user peak throughput of 54 Mbps; the IEEE 802.11n Standard specifies a single-user peak throughput of 600 Mbps; and the IEEE 802.11ac Standard specifies a single-user peak throughput of 6.77 gigabits per second (Gbps). Work has begun on a new standard, IEEE 802.11ax, that promises to provide even greater throughput.

SUMMARY

In an embodiment, a method includes detecting, at a first communication device, a plurality of multicast packets transmitted by a second communication device; determining, at the first communication device, information contained in media access control (MAC) address fields of the plurality of multicast packets; and determining, at the first communication device, wireless local area network (WLAN) provisioning information for gaining access to the WLAN, wherein the provisioning information is determined from the information contained in the MAC address fields of the plurality of multicast packets.

In another embodiment, another method includes receiving, at a first communication device, provisioning information for access to a WLAN; encoding, at the first communication device, the provisioning information in MAC address fields of a plurality of multicast packets; and transmitting, by the first communication device, the plurality of multicast packets to a second communication device.

In yet another embodiment, an apparatus comprises a first communication device having one or more integrated circuit devices configured to: detect a plurality of multicast packets transmitted by a second communication device, determine information contained in MAC address fields of the plurality of multicast packets, and determine WLAN provisioning information for gaining access to the WLAN, wherein the provisioning information is determined from the information contained in the MAC address fields of the plurality of multicast packets.

In still another embodiment, another communication device includes a processor and a network interface. The communication device is configured to: receive provisioning information for access to a WLAN, encode the provisioning information in MAC address fields of a plurality of multicast packets, and transmit the plurality of multicast packets.

DETAILED DESCRIPTION

In embodiments described below, a first communication device transmits wireless network provisioning information to a second communication device. The provisioning information is used by the second communication device to gain access to a wireless network such as a wireless local area network (WLAN), a personal area network (PAN), etc.

Wireless network technology has reached a state of maturity in which it is now commonly employed by consumers in household settings. Televisions, audio equipment, children's toys, home appliances, etc., are increasingly being enabled with network interface devices that provide wireless connectivity to wireless networks such as WLANs, PANs (e.g., BLUETOOTH®), mesh networks, ad hoc networks, etc. As an illustrative example, the Marvell Wireless Microcontroller™ (MWM) can be included in a device, for example, a home appliance, to provide the device with connectivity to a WLAN. In some embodiments, wireless networks employ provisioning procedures to provide a level of security, e.g., to allow only authorized devices access to the network. Typically, provisioning is a one-time process in which a device with a wireless network interface provides network credentials to a wireless network (e.g., to a wireless access point) to allow the device to join the wireless network. The network credentials include, for example, a passphrase or password (referred to herein as a passphrase for brevity), according to some embodiments. In some embodiments, the network credentials include a network identifier such as a basic service set identifier (BSSID), etc.

Figure 1:
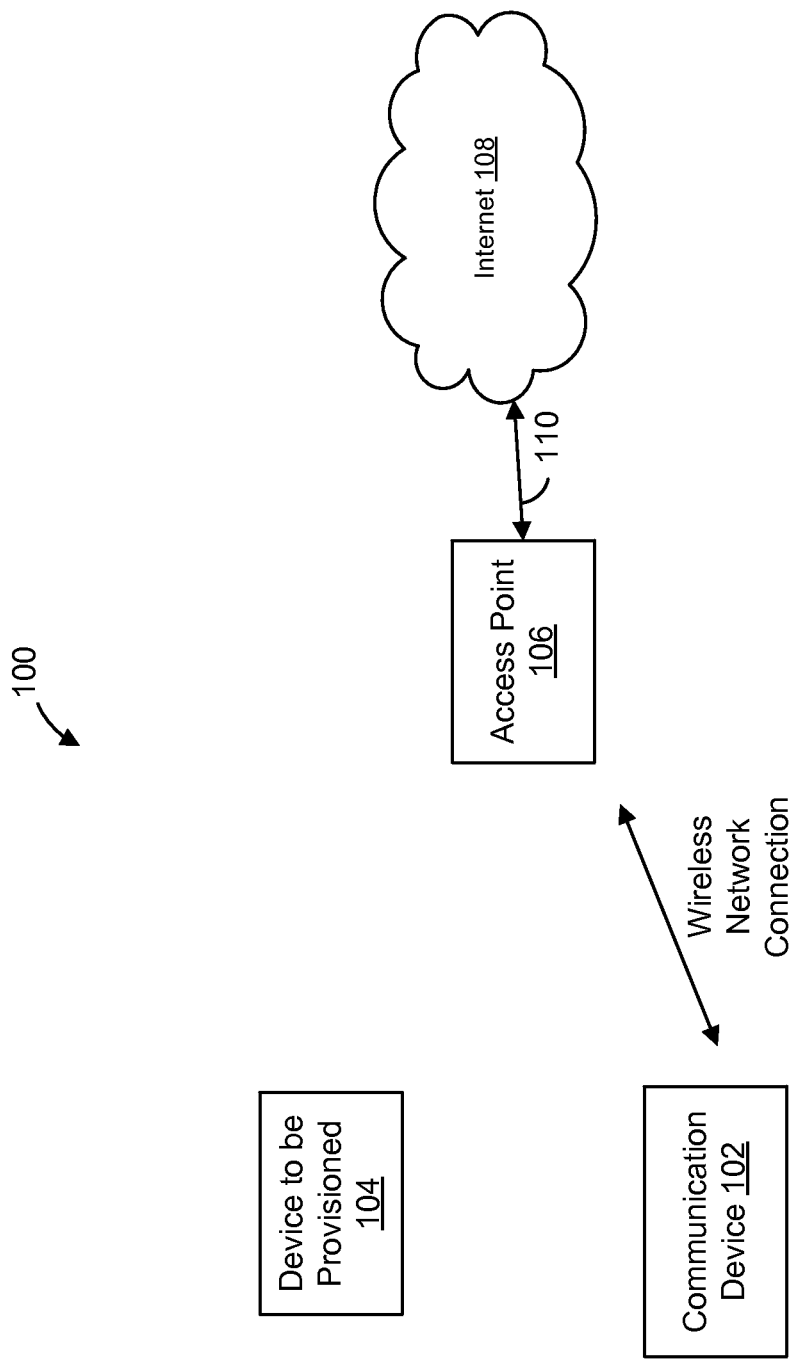
FIG. 1 is a schematic illustration of a wireless local area network (WLAN) wherein a first communication device is used to transmit WLAN access provisioning information to a second communication device, according to an embodiment.

FIG. 1 is a schematic illustration of a wireless local area network (WLAN) 100 in which a first communication device transmits WLAN provisioning information to a second communication device, according to an embodiment. In particular, a smartphone 102 transmits WLAN provisioning information to a device 104, e.g., a device (such as a television, audio equipment, a toy, an appliance, etc.) that includes a WLAN network interface device. As merely an illustrative example, the device 104 includes an MWM and is sometimes referred to herein as an MWM-enabled device 104, according to an illustrative embodiment. The smartphone 102 is a member of the WLAN and communicates with an access point (AP) 106 for the WLAN, according to an embodiment. The AP 106 is, in turn, communicatively coupled to a network 108 (e.g., a wide area network, a mobile telephony network, the Internet, an internet, an extranet, etc.) via a wired or wireless connection 110. In some embodiments, the communication device 102 is another suitable device such as a desktop computer, a laptop computer, a tablet computer, etc. In some embodiments, the device 104 is a device having a suitable wireless network interface device such as a WLAN network interface device, a PAN network interface device, etc. In some embodiments, the communication device 106 is another suitable device such as a PAN device. In some embodiments, the network 100 is suitable network other than a WLAN such as a PAN, etc. Merely for explanatory purposes, however, FIG. 1 is discussed in the context of an embodiment in which the network 100 is a WLAN, the communication device 102 is a smartphone, the device 104 is an MWM-enabled device, and the communication device 106 is an AP.

A conventional procedure for provisioning the MWM-enabled device 104 will now be described as background. The smartphone 102 begins in a default state in which the smartphone 102 is connected to the home WLAN through a wireless network connection to the AP 106. In order to provision the MWM-enabled device 104, the smartphone 102 is first disconnected from the AP 106. Then a wireless connection is established between the smartphone 102 and the MWM-enabled device 104. In this sense, the MWM-enabled device 104 acts like another AP to which the smartphone 102 connects. Then a browser or native application is started on the smartphone 102.

Through user interaction with the browser or native application, wireless network provisioning information is entered into the smartphone 102. For example, a user types into the smartphone the Internet Protocol (IP) address of the home WLAN. The user further enters a passphrase to be used to access the WLAN. The provisioning information is then transmitted by the smartphone 102 to the communication device 104. After confirming that the MWM-enabled device 104 has been properly provisioned, the smartphone 102 is disconnected from the MWM-enabled device 104 and reconnected to the AP 106. At this point, the MWM-enabled device 104 can join the WLAN by establishing a wireless connection with the AP 106 using the provisioning information provided by the smartphone 102 during the provisioning procedure.

As can be readily appreciated from the above discussion, the conventional procedure for provisioning a MWM enabled device 104 is a time-consuming, multi-step process. Embodiments described below, however, provide a more streamlined procedure for provisioning a device such as the MWM-enabled device 104.

According to some embodiments, the first communication device 102 transmits provisioning information to the second communication device 104 by wirelessly transmitting a plurality of multicast packets, wherein the provisioning information is encoded in media access control (MAC) address fields of the plurality of multicast packets. In some embodiments, the first communication device 102 wirelessly transmits the plurality of multicast packets while still being connected with the wireless network (e.g., without first disconnecting from the wireless network). The second communication device 104 receives the information by operating in a "sniffer" mode in which the second communication device 104 is configured or programmed to recognize or detect a preamble in MAC address fields of the plurality of multicast packets transmitted by the first communication device 102, according to an embodiment. In some embodiments, the multicast packets appear as normal multicast traffic to other communication devices in the WLAN and/or to devices outside the WLAN.

Once the second communication device 104 receives the provisioning information from the first communication device 102, the second communication device 104 switches from the "sniffer" mode into a normal operation mode. In the normal operation mode, the second communication device 104 establishes a wireless network connection with the communication device 106 using the provisioning information received from the first communication device 102. In some embodiments, the provisioning information includes one of or any suitable combination of two or more of a passphrase, a network ID, a BSSID, an IP address, etc. As an illustrative example, the second communication device 104 establishes a connection with the AP 106 using a BSSID and a passphrase obtained by the second communication device 104 from the plurality of multicast packets.

According to an embodiment, communication devices in the wireless network 100 transmit and receive data via multicast and unicast transmissions. In the case of unicast transmissions, each node in the WLAN is associated with a unique address such as a MAC address, an IP address, etc. When using a unicast transmission mode, the AP 106 sends unicast packets to specific nodes in the WLAN by addressing the unicast packets with appropriate addresses. For example, each unicast packet contains a unique MAC address associated with the node of the intended receiving device. The receiving device detects the unicast packet based on recognizing its own MAC address in the unicast packet. Another unintended device ignores the unicast packet because the unicast packet does not include the MAC of the other device.

When operating in a multicast mode, the AP 106 sends multicast packets to a group of receiving nodes, according to an embodiment. In this case, the AP 106 sends a multicast packet that includes a multicast address such as a multicast MAC address associated with one or more devices in the network 100. A multicast packet with the multicast address is detected by all of the devices associated with the multicast IP address.

According to an embodiment, the MWM-enabled device 104 is configured to operate in a "sniffer mode", in which the device 104 captures all packets that are transmitted in the network e.g., packets that are "in the air") such that the MWM-enabled device 104 can analyze packets that are being transmitted by any of the devices within the network 100 and that are addressed to any unicast or multicast address. In some embodiments, the MWM-enabled device 104 captures all packets transmitted on a selected wireless channel. In an embodiment, before provisioning, the device 104 operating in the sniffer mode is not connected to the network 100 or any of the devices in the network 100 but can, nonetheless, intercept traffic in the wireless network 100.

As described above, according to an embodiment, the MWM-enabled device 104 is configured to determine whether a given packet is a unicast-type or a multicast-type. For example, in some embodiments, multicast-type packets include an address (e.g., a MAC destination address) having a pattern indicative of the multi-cast type. Irrespective of whether the network 100 utilizes multicast transmissions, the first communication device 102 is configured to transmit multicast packets, and the second communication device 104 is configured to detect such multicast packets, according to an embodiment.

For example, the MWM-enabled device 104 is configured or programmed to detect multicast packets that include a preamble contained in MAC address fields (e.g., MAC destination fields) of the multicast packets. According to an embodiment, the preamble may be associated with exchanging wireless network provisioning information. As described in further detail below, once the preamble is detected in a packet by the MWM-enabled device 104, further information contained in the MAC destination address is extracted by the MWM-enabled device 104, according to an embodiment. Such further information contains provisioning information, according to an embodiment, as described further below.

In an embodiment, communication devices in the wireless network encapsulate IP multicast packets in MAC multicast frames prior to transmission via the wireless network 100. According to some embodiments, a MAC multicast destination address is generated by including a set of least significant bits of the multicast IP address into a set of least significant bits of the MAC multicast destination address. In an embodiment, the set of least significant bits of the multicast IP address are generated to include network provisioning information such as discussed above.

Figure 2:
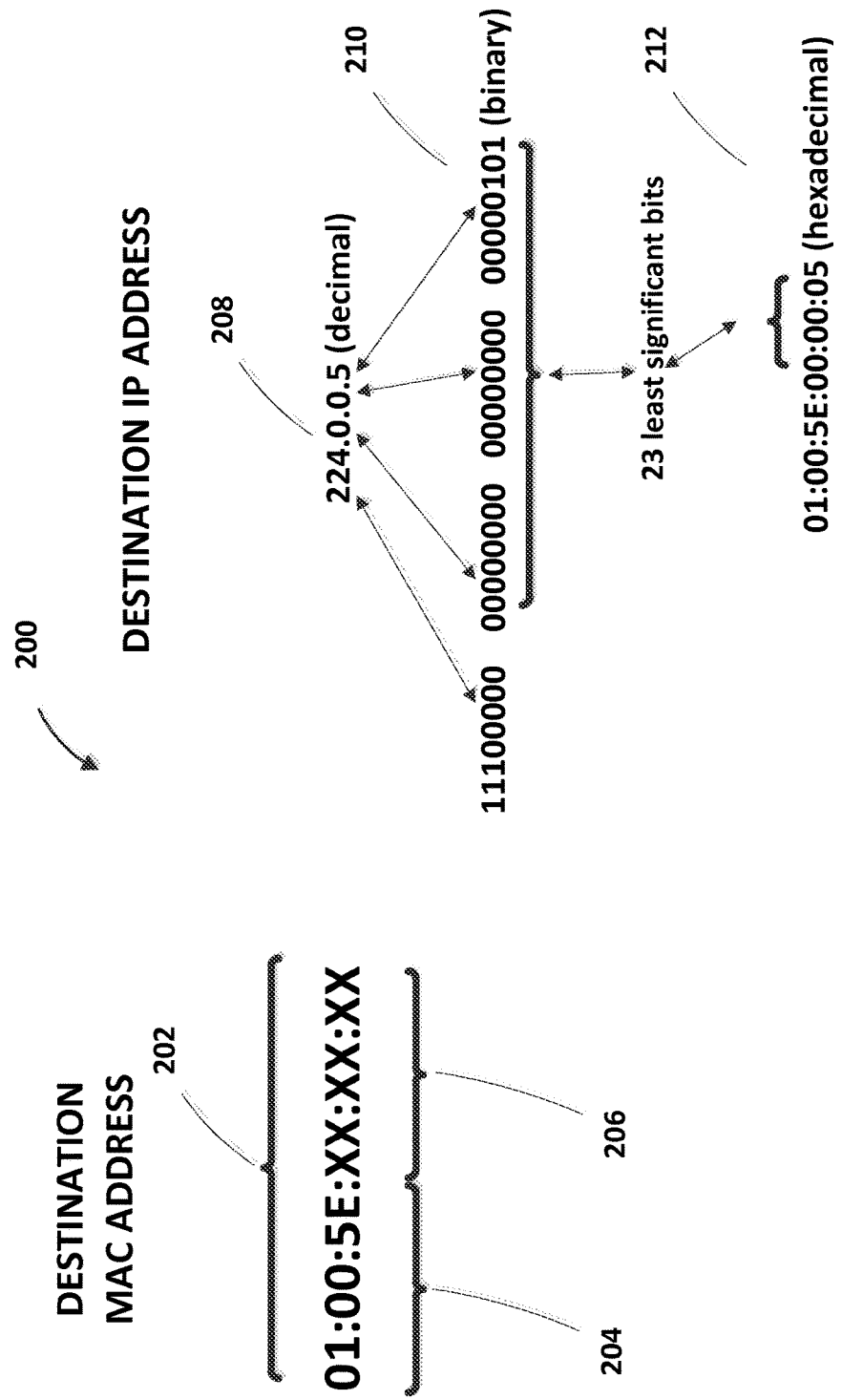
FIG. 2 is a diagram of an example encoding of wireless network provisioning information in least significant bits of a MAC destination field of a multicast packet, according to an embodiment.

FIG. 2 is a diagram of an example encoding of wireless network provisioning information in least significant bits of a MAC destination field of a multicast packet, according to an embodiment. Ethernet multicast frames 202 have an associated destination MAC address of the format 01:00:5E:XX:XX:XX, according to an embodiment. In this example, each character (e.g., 0, 1, 5, E) represents a hexadecimal number represented by 4 bits of data. The sequence 01:00:5E 204 indicates that the packet is a multicast packet, according to an embodiment. The sequence XX:XX:XX schematically represents the least significant 24 bits 206 of the destination MAC address. Out of the 24 bits of the sequence XX:XX:XX, the most significant bit is set to 0 by convention, leaving 23 bits, according to an embodiment. The values of these remaining 23 bits are determined from the corresponding 23 least significant bits of a multicast IP address corresponding to an IP multicast packet that is encapsulated within the MAC frame, according to an embodiment in which the IP multicast packet conforms to the Internet Protocol version 4 (IPv4).

As an illustrative example in which IPv4 addresses are utilized, suppose a destination multicast IP address 208 is 224.0.0.5. A binary representation 210 of the destination multicast IP address 208 is shown in FIG. 2. The least significant 23 bits of the destination multicast IP address 208 are then used as the 23 least significant bits of the destination MAC address 212. By convention the most significant 24 bits of the MAC address 212 are fixed to the sequence 01:00:5E, and bit 24 is set to 0, according to an embodiment. Thus, in this example, the destination IP address 224.0.0.5 gets converted to the destination MAC address 01:00:5E:00:00:05. The least significant 23 bits of the address 212 can be used to encode the provisioning information. In another embodiment, bit 24 is set to one.

In other embodiments, Internet Protocol version 6 (IPv6) addresses are utilized, and the least significant 32 bits of the multicast destination IP address are similarly utilized as the least significant 32 bits of the multicast destination MAC address.

Figure 3:
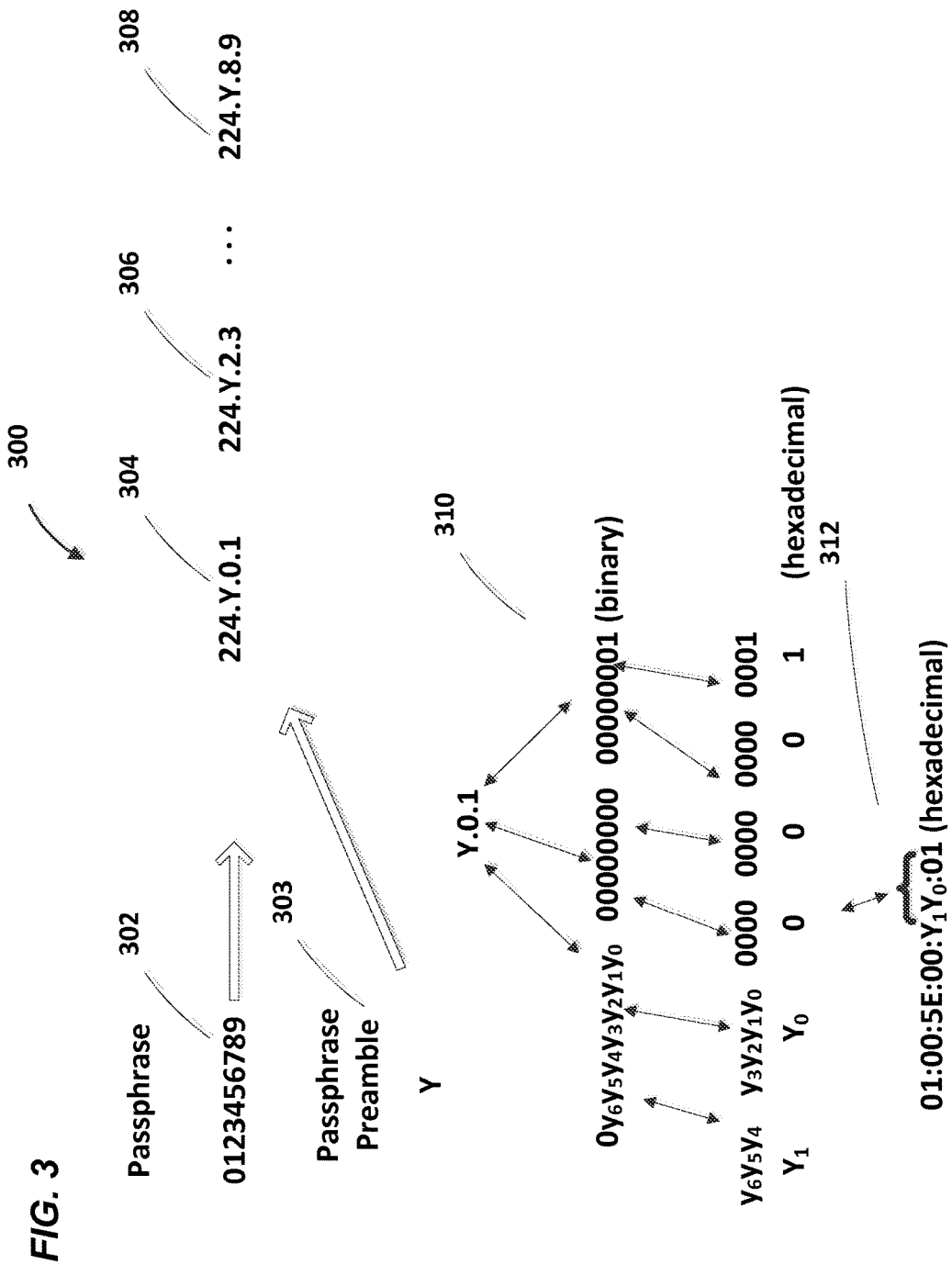
FIG. 3 is a diagram of an example encoding of wireless network provisioning information in least significant bits of a destination MAC address, according to an embodiment.

FIG. 3 is a diagram of an example encoding of wireless network provisioning information in least significant bits of a destination MAC address, according to an embodiment. For instance, FIG. 3 illustrates encoding of a passphrase 302 into least significant bits of MAC address fields of multicast packets according to an embodiment in which IPv4 is utilized. For example, in an embodiment, the passphrase 302 is encoded in the least significant 23 bits of MAC destination address fields of a plurality of multicast MAC frames.

In the illustrative example of FIG. 3, the passphrase 302 is partitioned into five chunks (e.g., 01, 23, 34, 67, 89). Additionally, a preamble Y 303 is utilized to signal that the multicast destination addresses include passphrase information. In some embodiments, different preambles are utilized to signal the type of provisioning information encoded in the MAC destination addresses. For example, the preamble Y is utilized to signal passphrase information is encoded in the MAC destination address, whereas a preamble Q is utilized to signal a length of the passphrase is encoded in the MAC destination address, in an embodiment. Provisioning information includes checksum information utilized to verify other provisioning information such as passphrase information, according to an embodiment. Thus, in an embodiment, a preamble Z is utilized to signal checksum information is encoded in the MAC destination address. In some embodiments, different preambles are utilized to also signal which portion of the passphrase is encoded in a particular MAC destination address. For example, a preamble $T_1$ is utilized to signal a first chunk of the passphrase in an ordered list of chunks; a preamble $T_2$ is utilized to signal a second chunk of the passphrase in the ordered list of chunks; a preamble $T_3$ is utilized to signal a third chunk of the passphrase in the ordered list of chunks; etc. Similarly, in some embodiments, different preambles are utilized to also signal which portion of the checksum is encoded in a particular MAC destination address. For example, a preamble $Z_1$ is utilized to signal a first chunk of the checksum in an ordered list of chunks; a preamble $Z_2$ is utilized to signal a second chunk of the checksum in the ordered list of chunks; etc.

Appropriate preambles 303 (e.g., Y, Q, Z, etc.) and respective chunks of the passphrase are utilized to generate a plurality of multicast IP addresses 304, 306, . . . 308. For example, a first chunk of the passphrase 302 and the preamble 303 are utilized to generate a first multicast IP address 304; a second chunk of the passphrase 302 and the preamble 303 are utilized to generate a second multicast IP address 306; . . . a last chunk of the passphrase 302 and the preamble 303 are utilized to generate a last multicast IP address 308. For example, the preamble 303 and the respective chunk are utilized as the least significant 23 bits of the multicast IP address, according to an embodiment in which IPv4 is utilized.

FIG. 3 shows the least significant 23 bits 310 of the IP multicast address 304. The least significant 23 bits 310 of the IP multicast address 304 are utilized to generate a MAC destination address 312, where the most significant 24 bits are set to 01:00:5E to signal a multicast-type address, and bit 24 is set to zero, according to an embodiment (or set to one in another embodiment).

According to an embodiment, the first communication device 102 (e.g., a smartphone) includes a processor that executes a software application configured to cause the first communication device 102 to generate multicast MAC frames with particular MAC destination addresses. For example, in an embodiment, the application, when executed by the communication device 102, generates a plurality of User Datagram Protocol (UDP) packets addressed to IP multicast addresses, where the IP multicast addresses are generated by the application so that least significant bits of the IP multicast addresses encode provisioning information such as described above. Referring to FIG. 3 as merely an illustrative example, the application is configured to generate UDP packets for sending to the IP multicast addresses 304, 306, . . . 308, in an embodiment. A network interface device of the communication device 102 then generates MAC frames such as described above, in an embodiment. For example, in an embodiment utilizing IPv4, the network interface device of the communication device 102 creates MAC destination addresses using the 23 least significant bits of the IP multicast addresses, generates a plurality of MAC frames having the plurality of MAC destination addresses, and transmits the plurality of MAC frames.

According to an embodiment, the communication device 104 periodically navigates through all available channels and available Basic Service Sets (BSSs). When the communication device 104 detects a matching preamble sequence in the destination MAC addresses of consecutive frames, it captures subsequent multicast frames to extract provisioning information. In some embodiments, the provisioning information includes passphrase information and checksum information that is utilized to verify the passphrase information. In an embodiment, the communication device 104 uses extracted passphrase information to generate the passphrase and uses extracted checksum information to verify the passphrase. When the passphrase is generated and verified, the communication device 104 utilizes the passphrase to join the wireless network 100, according to an embodiment.

The above described embodiments encode provisioning information in the destination MAC address, which is generally unencrypted even when sending packets containing encrypted data. As such, these embodiments may be susceptible to malicious attack by other devices (e.g., rogue "sniffers") that may also intercept the data encoded in the destination MAC address. Further embodiments provide added security by encrypting provisioning information before the provisioning information is encoded in the destination MAC address. For example, in some embodiments, the communication device 104 is provided with an encryption key, which may be printed and/or displayed on, or otherwise associated with, the communication device 104. This printed/displayed key is provided as input to the application (discussed above) running on the first communication device 102. For example, the user may type in the key, if the communication device 102 includes or is coupled to a camera, the key may be scanned by the camera (e.g., the key may be printed/displayed as a bar code on or associated with the communication device 104), etc., according to various embodiments. In some embodiments, the first device 102 is configured or programmed to encrypt the passphrase and/or checksum using the key. Correspondingly, the communication device 104 is configured or programmed to extract passphrase and checksum information from MAC destination addresses (such as described above), and then decrypt the extracted passphrase information and/o the extracted checksum information.

Further embodiments may use other suitable protocols such as Internet Protocol version 6 (IPv6), as discussed above. In such embodiments, more data and be encoded in each MAC destination address. For example, when using IPv6 packets, the least significant 32 bits of an IP multicast address can be used to encode provisioning information using techniques similar to those discussed above. In an embodiment utilizing IPv6, the least significant 32 bits of an IP multicast address are utilized as the least significant 32 bits of a MAC destination address of a MAC frame.

Figure 4:
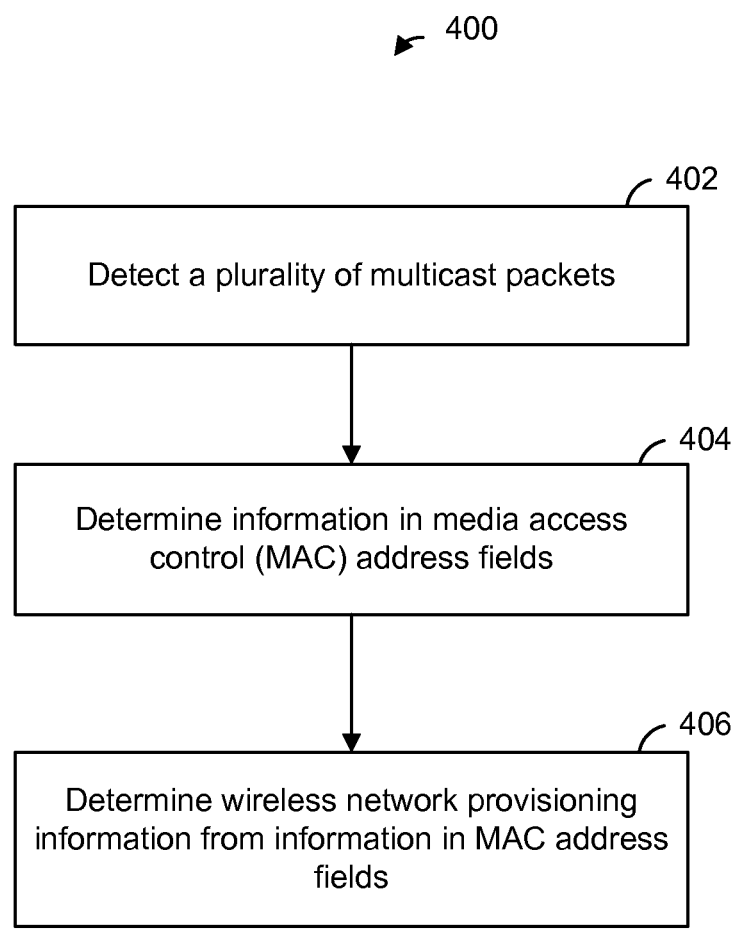
FIG. 4 is a flow diagram of an example method of transmitting wireless network provisioning information from a plurality of multicast packets, according to an embodiment.

FIG. 4 is a flow diagram of an example method 400 of determining wireless network provisioning information encoded in a plurality of multicast packets, according to an embodiment. The method 400 is implemented by the communication device 104, according to an embodiment. In other embodiments, the method 400 is implemented by another suitable communication device. The method 400 is discussed with reference to FIGS. 1 and 3 merely for explanatory purposes. In other embodiments, the method 400 is utilized in connection with other suitable wireless networks different than the network 100 of FIG. 1 and/or with other suitable techniques different than the technique illustrated in FIG. 3.

At block 402 a first communication device detects a plurality of multicast packets transmitted by a second communication device. As illustrated in FIG. 1, the first communication device is the device 104 and the second communication device tis the communication device 102, according to an embodiment. The first communication device detects the plurality of multicast packets by detecting one or more preambles in a MAC multicast destination address of the plurality of packets, according to an embodiment. In some embodiments, the one or more preambles are preambles known to the first communication device to correspond to wireless network provisioning information encoded in MAC multicast destination addresses.

In an embodiment, block 402 includes, when the device 104 recognizes a matching preamble sequence in the destination MAC addresses of consecutive frames, it captures subsequent multicast frames for subsequent extraction of wireless network provisioning information, according to an embodiment.

At block 404, the first communication device determines information contained in MAC address fields of the plurality of multicast packets. For example, in an embodiment, the first communication device extracts information from a set of least significant bits of each MAC destination address field of each multicast packet. In an embodiment in which IPv4 is utilized, the first communication device extracts information from the 23 least significant bits of the destination MAC address. In an embodiment in which IPv6 is utilized, the first communication device extracts information from the 32 least significant bits of the destination MAC address.

At block 406 the first communication device determines wireless local area network (WLAN) provisioning information for gaining access to the WLAN, wherein the provisioning information is determined from the information, determined at block 404, encoded in the MAC address fields of the plurality of multicast packets. In an embodiment, block 406 includes determining a passphrase from the information, determined at block 404, encoded in the MAC address fields of the plurality of multicast packets. In an embodiment, block 406 includes concatenating information from multiple MAC address fields in the plurality of multicast packets. For example, in an embodiment, block 406 includes concatenating information from multiple MAC address fields in the plurality of multicast packets to form a passphrase or an encrypted passphrase. As another example, in an embodiment, block 406 includes concatenating information from multiple MAC address fields in the plurality of multicast packets to form a checksum for the passphrase or an encrypted checksum for the passphrase.

In some embodiments, block 406 includes decrypting information extracted from MAC address fields in the plurality of multicast packets. For example, in an embodiment, block 406 includes decrypting information extracted from one or more MAC address fields in the plurality of multicast packets to generate a decrypted passphrase or a decrypted portion of the passphrase. As another example, in an embodiment, block 406 includes decrypting information extracted from one or more MAC address fields in the plurality of multicast packets to generate a decrypted checksum for the passphrase or a decrypted portion of the checksum for the passphrase.

In some embodiments, block 406 includes extracting a network ID (e.g., a BSSID) or an encrypted network ID from one or more MAC address fields in the plurality of multicast packets. If the network ID is encrypted, block 406 includes decrypting the network ID, in an embodiment.

In some embodiments, block 406 includes extracting an address of a network node (e.g., an IP address of an access point, an address of a master device of a piconet, a node in a mesh network) or an encrypted address of the network node from one or more MAC address fields in the plurality of multicast packets. If the address of the node is encrypted, block 406 includes decrypting the address, in an embodiment.

Figure 5:
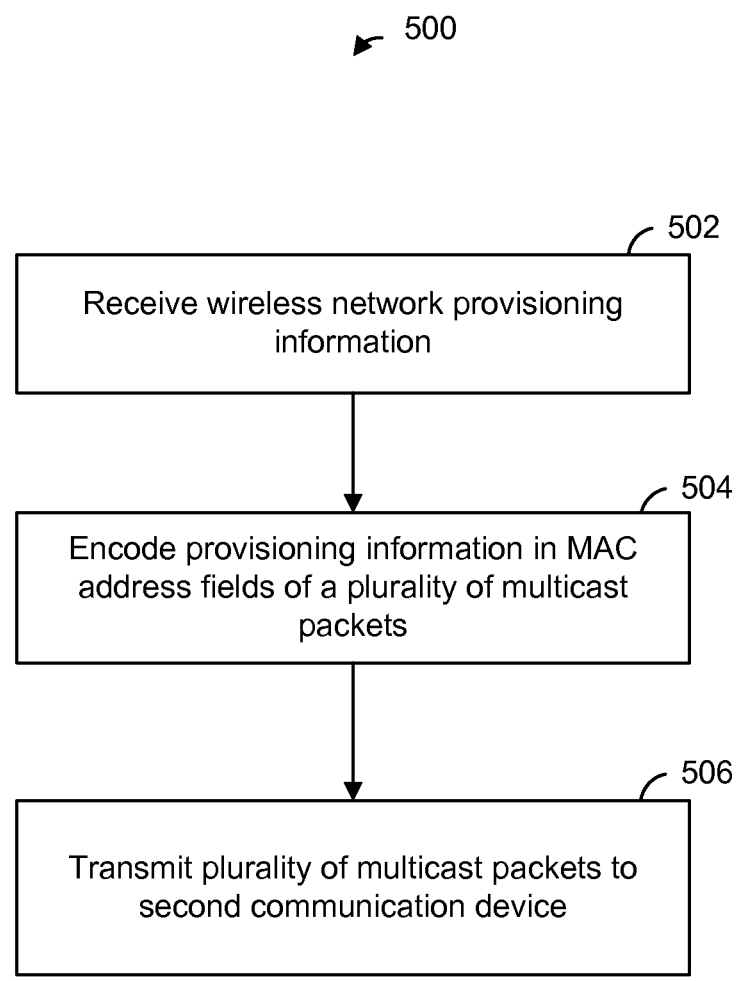
FIG. 5 is a flow diagram of an example method of providing wireless network provisioning information in a plurality of multicast packets, according to an embodiment.

FIG. 5 is a flow diagram of an example method 500 of providing wireless network provisioning information in a plurality of multicast packets, according to an embodiment. The method 500 is implemented by the communication device 102, according to an embodiment. For example, in an embodiment, the method 500 is implemented, at least partially, by a processor executing machine readable instructions stored in a memory device coupled to the processor. In an embodiment, a portion of the method 500 is implemented by a wireless network interface device coupled to the processor.

In some embodiments, the method 500 is implemented by another suitable communication device other than the communication device 102. The method 500 is discussed with reference to FIGS. 1 and 3 merely for explanatory purposes. In other embodiments, the method 500 is utilized in connection with other suitable wireless networks different than the network 100 of FIG. 1 and/or with other suitable techniques different than the technique illustrated in FIG. 3.

At block 502, a first communication device receives provisioning information for access to a wireless network (e.g., a WLAN, a PAN, a mesh network, an ad-hoc network, etc.). For example, in an embodiment, the first communication device is the communication device 102 or another suitable communication device. The first communication device receives provisioning information that is input by a user, according to an embodiment. For example, in an embodiment, the application is configured to prompt (e.g., via a user interface such as a graphical user interface (GUI), voice prompts (e.g., using text-to-voice technology, etc.) the user to input, using the communication device 102, the provisioning information. In other embodiments, the first device receives provisioning information from another device in the wireless network and/or from a storage device (e.g., a memory device such as a RAM, ROM, Flash memory, etc.) included in or communicatively coupled to the communication device 102. In various embodiments, the provisioning information includes one of or any suitable combination of two or more of a passphrase, a checksum for the passphrase, a network ID, an address of a node in the wireless network, etc.

At block 504, the first communication device encodes the provisioning information in media access control (MAC) address fields of a plurality of multicast packets. In some embodiments, block 504 comprises including provisioning information in respective sets of least significant bits of MAC destination address fields in the plurality of multicast packets. In some embodiments, block 504 comprises including in the respective sets of least significant bits of MAC destination address fields one or more preambles that i) are known to a second communication device to which the provisioning information is intended, and ii) signal that the MAC destination address fields include provisioning information. In various embodiments, each of the one or more preambles also signal i) the type of provisioning information included in the MAC destination address field, and/or ii) which portion of provisioning information is included in the MAC destination address field.

In some embodiments, block 504 includes encrypting some or all of the provisioning information prior to including provisioning information in the multicast address fields. For example, in an embodiment, the application is configured to obtain an encryption key and to utilize the encryption key to encrypt some or all of the provisioning information. For example, in an embodiment, the application is configured to prompt (e.g., via a user interface such as a graphical user interface (GUI), voice prompts (e.g., using text-to-voice technology, etc.) the user to input, using the communication device 102, the encryption key. In some embodiments, the encryption key is printed on and/or displayed by the device to which the provisioning information is to be transmitted.

In some embodiments, block 504 comprises the application generating UDP packets and associated IP multicast addresses to which the UDP packets are addressed, such as described above. In some embodiments, an IP layer module implemented on the first communication device (e.g., executed by the processor or implemented by another suitable apparatus included in the first communication device) generates IP multicast packets that encapsulate the UDP packets and that include the IP multicast addresses. In some embodiments, a MAC layer module implemented on the first communication device (e.g., executed by the processor or implemented by another suitable apparatus of the first communication device, such as the network interface device) generates MAC frames that encapsulate the IP packets and that include the MAC multicast destination addresses discussed above.

At block 506, the first communication device transmits the plurality of multicast packets to a second communication device. The application causes the first communication device to transmit the plurality of multicast packets to a second communication device, in an embodiment.

Figure 6:
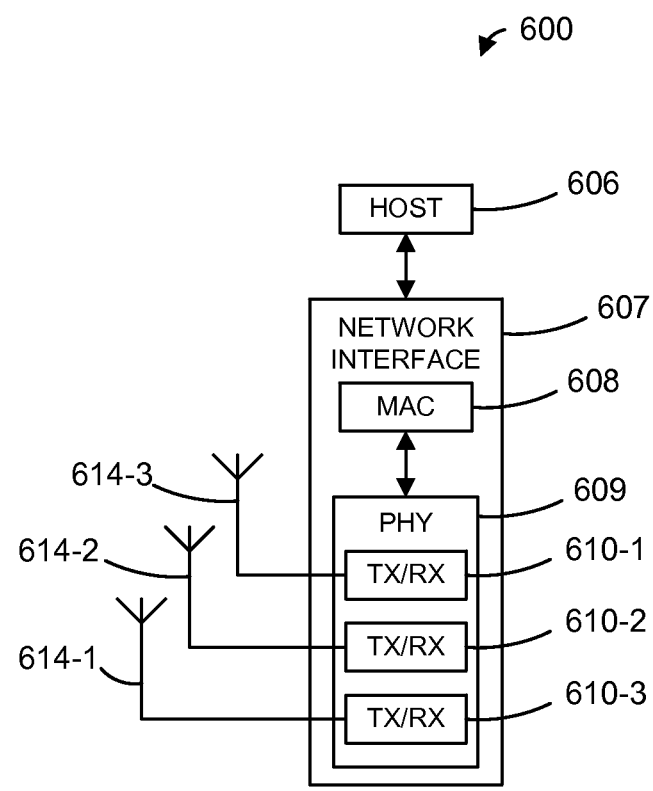
FIG. 6 is a diagram of an example apparatus that implements the method of FIG. 4 or the method of FIG. 5, according to some embodiments.

FIG. 6 is a diagram of an example apparatus 600 that is included in the device 104 of FIG. 1 to provide the device 104 with wireless network connectivity, according to an embodiment. For example, in various embodiments, the apparatus 600 is included in a television, audio equipment, a toy, a home appliance, etc., or another suitable device, to provide the device 104 with wireless network connectivity.

In an embodiment, the apparatus 600 implements the method 400 of FIG. 4. Merely for explanatory purposes, FIG. 6 is described with reference to FIG. 4. In some embodiments, however, the apparatus 600 implements another suitable method. Similarly, in some embodiments, the method 400 is implemented by another suitable apparatus.

The apparatus 600 includes a host processor 606 coupled to a network interface device 607. In some embodiments, the host processor 606 is a processor of the device 104 that provides functionality related to operations and/or functionality of a television, audio equipment, gaming, a home appliance, etc., according to various embodiments. In other embodiments, the host processor 606 is separate from and coupled to another processor that provides functionality related to operations and/or functionality of a television, audio equipment, gaming, a home appliance, etc. In some embodiments, the host processor 606 executes machine readable instructions stored in a memory device (not shown) coupled to the host processor 606.

The network interface 607 includes a MAC processing unit 608 and a PHY processing unit 609. The MAC processing unit 608 is configured to implement MAC functions defined by a wireless communication protocol. In various embodiments, the MAC processing unit 608 is configured to implement MAC functions defined by a WLAN protocol (e.g., one or more versions of the IEEE 802.11 Standard protocol), a PAN protocol (e.g., BLUETOOTH®), etc. The PHY processing unit 609 is configured to implement PHY functions defined by the wireless communication protocol. In various embodiments, the PHY processing unit 609 is configured to implement PHY functions defined by defined by a WLAN protocol (e.g., one or more versions of the IEEE 802.11 Standard protocol), a PAN protocol (e.g., BLUETOOTH®), etc.

The PHY processing unit 609 includes one or more transceivers 610, and the transceiver(s) 610 are coupled to one or more antennas 614. Although three transceivers 610 and three antennas 614 are illustrated in FIG. 6, the apparatus 600 can include different suitable numbers (e.g., 1, 2, 4, 5, etc.) of transceiver(s) 610 and antenna(s) 614 in other embodiments. The number of antennas 614 need not be the same as the number of transceivers 610. In some embodiments, multiple transceivers 610 are coupled to the same antenna. In some embodiments, there are more antennas 614 than transceivers 610 and antenna switching techniques are utilized. Additionally, in some embodiments, the network interface 607 is configured to utilize antenna diversity, antenna beamforming, and/or a MIMO technique such as spatial multiplexing.

Referring now to FIG. 4, in an embodiment, the network interface 607 implements blocks 402, 404, and 406. In other embodiments, the host processor 606 and the network interface 607 implement blocks 402, 404, and 406. For example, in an embodiment, the network interface 607 implements blocks 402 and 404 and provides information determined at block 404 to the host processor 606. Then, the host processor 606 implements block 406. In other embodiments, the host processor 606 and the network interface 607 implement blocks 402, 404, and 406 in another suitable manner. In various embodiments, the host processor 606 and/or the network interface 607 decrypt provisioning information as described above.

In some embodiments, the example apparatus 600 is included in the device 102 of FIG. 1. For example, in various embodiments, the apparatus 600 is included in a smartphone, a laptop computer, a desktop computer, a tablet computer, a personal digital assistant (PDA), etc.

In an embodiment, the apparatus 600 implements the method 400 of FIG. 5. Merely for explanatory purposes, FIG. 6 is also described with reference to FIG. 5. In some embodiments, however, the apparatus 600 implements another suitable method. Similarly, in some embodiments, the method 500 is implemented by another suitable apparatus.

In some embodiments, the host processor 606 is a processor of the device 102 that provides functionality related to operations and/or functionality of a general purpose computer, for mobile telephony, etc., according to various embodiments. In other embodiments, the host processor 606 is separate from and coupled to another processor that provides functionality related to operations and/or functionality of a general purpose computer, for mobile telephone, etc.

Referring now to FIG. 5, in an embodiment, the host processor 606 and the network interface 607 implements blocks 502, 504, and 506. For example, in an embodiment, the host processor 606 implements block 502, the host processor 606 and the network interface 607 jointly implement blocks 504, and the network interface 607 implements block 506. In other embodiments, the host processor 606 and the network interface 607 implement the method 500 in another suitable manner. In various embodiments, the host processor 606 and/or the network interface 607 encrypt provisioning information as described above.

Figure 7:
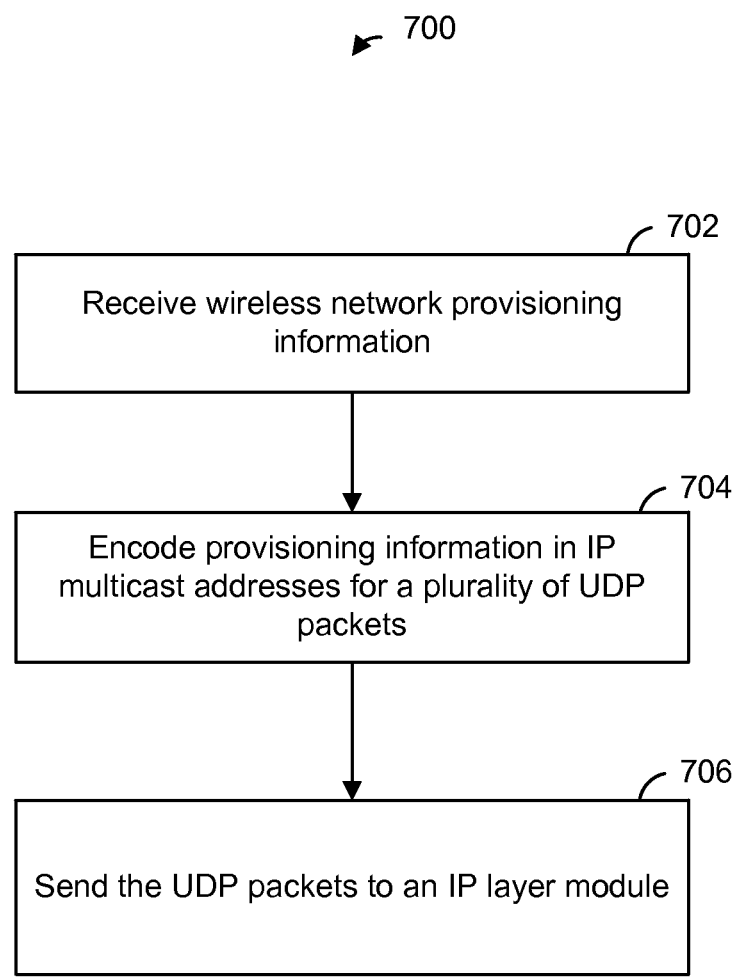
FIG. 7 is a flow diagram of another example method of providing wireless network provisioning information in a plurality of multicast packets, according to another embodiment.

FIG. 7 is a flow diagram of an example method 700 of providing wireless network provisioning information in a plurality of multicast packets, according to an embodiment. The method 700 is implemented by the communication device 102, according to an embodiment. For example, in an embodiment, the method 700 is implemented, at least partially, by a processor executing machine readable instructions stored in a memory device coupled to the processor. In an embodiment, the method 700 is implemented, at least partially, by the host processor 606 of FIG. 6. The method 700 is discussed with reference to FIG. 6 merely for explanatory purposes. In other embodiments, the method 700 is implemented by another suitable device.

At block 702, provisioning information for access to a wireless network (e.g., a WLAN, a PAN, a mesh network, an ad-hoc network, etc.) is received. For example, in an embodiment, host processor 606 receives provisioning information that is input by a user, according to an embodiment. For example, in an embodiment, an application executed by the host processor 606 (or another processor communicatively coupled to the host processor 606) is configured to prompt (e.g., via a user interface such as a graphical user interface (GUI), voice prompts (e.g., using text-to-voice technology, etc.) the user to input the provisioning information via a keyboard, a keypad, a touchscreen, etc. In some embodiments, the provisioning information is input via a camera (e.g., and then interpreting a bar code, using text recognition techniques, etc.). In other embodiments, the host processor 606 receives provisioning information via the network interface 607 and/or from a storage device (e.g., a memory device such as a RAM, ROM, Flash memory, etc.) included in or communicatively coupled to the host processor 606. In various embodiments, the provisioning information includes one of or any suitable combination of two or more of a passphrase, a checksum for the passphrase, a network ID, an address of a node in the wireless network, etc.

At block 704, the first communication device encodes the provisioning information in IP multicast addresses fields for a plurality of UDP packets. In some embodiments, block 704 comprises including provisioning information in respective sets of least significant bits of IP multicast destination address fields for a plurality of UDP packets. In some embodiments, block 704 comprises including in the respective sets of least significant bits of IP multicast address fields one or more preambles such as described above. In various embodiments, each of the one or more preambles also signal i) the type of provisioning information included, and/or ii) which portion of provisioning information is included.

In some embodiments, block 704 includes encrypting some or all of the provisioning information prior to including provisioning information in the IP multicast address fields. For example, in an embodiment, the application is configured to obtain an encryption key and to utilize the encryption key to encrypt some or all of the provisioning information. For example, in an embodiment, an application running on the host processor 606 (or another processor coupled to the host processor 606) is configured to prompt (e.g., via a user interface such as a GUI, voice prompts (e.g., using text-to-voice technology, etc.) the user to input, using the communication device 102, the encryption key. In some embodiments, the encryption key is printed on and/or displayed by the device to which the provisioning information is to be transmitted.

At block 706, the UDP packets and the IP multicast addresses are provided to an IP layer module implemented by the host processor 606, which then generates IP multicast packets that encapsulate the UDP packets and that include the IP multicast addresses. In some embodiments, the MAC layer module implemented on the host processor 606 and/or on the MAC processing device 608 generates MAC frames that encapsulate the IP packets and that include the MAC multicast destination addresses discussed above.

In an embodiment, an apparatus may include a first communication device having one or more integrated circuit devices configured to perform a number of operations. In a first operation, the apparatus may detect a plurality of multicast packets transmitted by a second communication device. In a second operation, the apparatus may determine information contained in MAC address fields of the plurality of multicast packets. In a third operation, the apparatus may determine WLAN provisioning information for gaining access to the WLAN, wherein the provisioning information is determined from the information contained in the MAC address fields of the plurality of multicast packets. As discussed above with reference to FIG. 1 an MWM-enabled device 104 is an illustrative example of such an apparatus that can determine WLAN provisioning information based on detecting a plurality of multicast packets.

In an embodiment, an apparatus may include a first communication device having one or more integrated circuit devices configured to perform a number of operations. In a first operation, the apparatus may receive provisioning information for access to a WLAN. For example, the first communication device may be a smartphone 102 or other similar device. The first communication device may receive provisioning information that is input by a user, according to an embodiment. In further embodiments, the first device may receive provisioning information from another device in the WLAN or from a storage device.

In a second operation, the first communication device may encode the provisioning information in media access control (MAC) address fields of a plurality of multicast packets. In a third operation, the first communication device may transmit the plurality of multicast packets to a second communication device.

In a further embodiment, the first communication device may encode the provisioning information in respective sets of least significant bits in multicast Internet Protocol (IP) destination addresses of the plurality of multicast packets. Further, this encoding may include encoding the provisioning information in the MAC address fields of the plurality of multicast packets comprises inserting the respective sets of least significant bits in the multicast IP destination addresses into respective sets of least significant bits in the MAC destination fields of the plurality of multicast packets.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any tangible, non-transitory computer readable memory such as on a magnetic disk, an optical disk, or other storage medium, in a RAM or ROM or flash memory, processor, hard disk drive, optical disk drive, tape drive, etc.

When implemented in hardware, the hardware may comprise one or more of discrete components, an integrated circuit, an application-specific integrated circuit (ASIC), a programmable logic device, etc.

Embodiments of the present disclosure may be embodied in any type of network interface device used in a communication system including, for example, devices used in communication systems including or coupled to a wired or wireless local area network (LAN) or a wired or wireless wide area network (WAN), the Internet, cable and/or satellite based communication systems, etc.

While the present invention has been described with reference to specific examples, which are intended to be illustrative only and not to be limiting of the invention, changes, additions and/or deletions may be made to the disclosed embodiments without departing from the scope of the claims.

What is claimed is:

1. A method, comprising:
   detecting, at a first communication device, a plurality of multicast packets transmitted by a second communication device;
   determining, at the first communication device, information contained in media access control (MAC) address fields of the plurality of multicast packets; and
   determining, at the first communication device, a passphrase for gaining access to a wireless local area network (WLAN) that is managed by an access point different than the second communication device, wherein the passphrase is determined from the information contained in the MAC address fields of the plurality of multicast packets, and wherein different portions of the passphrase are encoded in different ones of the multicast packets.

2. The method of claim 1, wherein determining the passphrase comprises determining the passphrase using respective sets of least significant bits in MAC destination fields of the plurality of multicast packets.

3. The method of claim 1, further comprising:
   determining, at the first communication device, a network identifier of the WLAN from the information contained in the MAC address fields of the plurality of multicast packets.

4. The method of claim 1, wherein determining the passphrase comprises:
   decrypting the information contained in the MAC address fields of the plurality of multicast packets; and
   determining the passphrase from the decrypted information.

5. The method of claim 1, wherein detecting the plurality of multicast packets comprises detecting multicast packets that include a preamble contained in the MAC address fields, the preamble associated with exchanging WLAN provisioning information.

6. A method, comprising:
receiving, at a first communication device, a passphrase for gaining access to a wireless local area network (WLAN) that is managed by an access point different than a second communication device;
encoding, at the first communication device, the passphrase in media access control (MAC) address fields of a plurality of multicast packets such that different portions of the passphrase are encoded in MAC address fields of different ones of the multicast packets; and
transmitting, by the first communication device, the plurality of multicast packets to the second communication device.

7. The method of claim 6, further comprising:
encoding, at the first communication device, the passphrase in respective sets of least significant bits in multicast Internet Protocol (IP) destination addresses of the plurality of multicast packets;
wherein encoding the passphrase in the MAC address fields of the plurality of multicast packets comprises inserting the respective sets of least significant bits in the multicast IP destination addresses into respective sets of least significant bits in the MAC destination fields of the plurality of multicast packets.

8. The method of claim 6, further comprising encoding, at the first communication device, a network identifier of the WLAN in the MAC address fields of the plurality of multicast packets.

9. The method of claim 6, further comprising:
encrypting, at the first communication device, the passphrase in the MAC address fields of the plurality of multicast packets.

10. The method of claim 6, further comprising:
inserting a preamble in the MAC address fields of the plurality of multicast packets, wherein the preamble is associated with exchanging WLAN provisioning information.

11. An apparatus comprising:
a first communication device having one or more integrated circuit devices configured to:
detect a plurality of multicast packets transmitted by a second communication device,
determine information contained in media access control (MAC) address fields of the plurality of multicast packets, and
determine a passphrase for gaining access to a wireless local area network (WLAN) that is managed by an access point different than the second communication device, wherein the passphrase is determined from the information contained in the MAC address fields of the plurality of multicast packets, and wherein different portions of the passphrase are encoded in different ones of the multicast packets.

12. The apparatus of claim 11, wherein the one or more integrated circuit devices are configured to determine the passphrase from respective sets of least significant bits in MAC destination fields of the plurality of multicast packets.

13. The apparatus of claim 11, wherein the one or more integrated circuit devices are configured to determine a network identifier of the WLAN from the information contained in the MAC address fields of the plurality of multicast packets.

14. The apparatus of claim 11, wherein the one or more integrated circuit devices are configured to:
decrypt the information contained in the MAC address fields of the plurality of multicast packets; and
determine the passphrase from the decrypted information.

15. The apparatus of claim 11, wherein the one or more integrated circuit devices are configured to detect multicast packets that include a preamble contained in the MAC address fields, the preamble associated with exchanging WLAN provisioning information.

16. An apparatus comprising:
a communication device having a processor and a network interface, wherein the first communication device is configured to:
receive a passphrase for access to a wireless local area network (WLAN) that is managed by an access point that is not a second communication device,
encode the passphrase in media access control (MAC) address fields of a plurality of multicast packets such that different portions of the passphrase are encoded in MAC address fields of different ones of the multicast packets, and
transmit the plurality of multicast packets to the second communication device.

17. The apparatus of claim 16, wherein the communication device is further configured to:
encode the passphrase in respective sets of least significant bits in multicast Internet Protocol (IP) destination addresses of the plurality of multicast packets, and
insert the respective sets of least significant bits in the multicast IP destination addresses into respective sets of least significant bits in the MAC destination fields of the plurality of multicast packets.

18. The apparatus of claim 16, wherein the communication device is further configured to:
encode a network identifier of the WLAN in the MAC address fields of the plurality of multicast packets.

19. The apparatus of claim 16, wherein the communication device is further configured to:
encrypt the passphrase in the MAC address fields of the plurality of multicast packets.

20. The apparatus of claim 16, wherein the communication device is further configured to:
insert a preamble in the MAC address fields of the plurality of multicast packets, wherein the preamble is associated with exchanging WLAN provisioning information.

* * * * *